US012285061B2

(12) United States Patent
Houde

(10) Patent No.: US 12,285,061 B2
(45) Date of Patent: Apr. 29, 2025

(54) FACEMASKS WITH MATERIAL LAYERS FOR ENHANCED BONDING PROCESS

(71) Applicant: O&M Halyard, Inc., Mechanicsville, VA (US)

(72) Inventor: Ajay Y. Houde, Johns Creek, GA (US)

(73) Assignee: O&M Halyard, Inc., Mechanicsville, VA (US)

( * ) Notice: Subject to any disclaimer, the term of this patent is extended or adjusted under 35 U.S.C. 154(b) by 693 days.

(21) Appl. No.: 16/064,678

(22) PCT Filed: Dec. 23, 2015

(86) PCT No.: PCT/US2015/000266
§ 371 (c)(1),
(2) Date: Jun. 21, 2018

(87) PCT Pub. No.: WO2017/111783
PCT Pub. Date: Jun. 29, 2017

(65) Prior Publication Data
US 2019/0000162 A1 Jan. 3, 2019

(51) Int. Cl.
*A41D 13/11* (2006.01)
*A62B 23/02* (2006.01)
(Continued)

(52) U.S. Cl.
CPC .......... *A41D 13/1123* (2013.01); *A41D 13/11* (2013.01); *A62B 23/025* (2013.01);
(Continued)

(58) Field of Classification Search
CPC ...... A61M 16/06; A62B 23/025; A41D 13/11; A41D 13/1123; A41D 2400/52;
(Continued)

(56) References Cited

U.S. PATENT DOCUMENTS 3,855,046 A * 12/1974 Hansen ..................... D04H 3/14
428/198
4,600,002 A * 7/1986 Maryyanek .......... A62B 23/025
128/206.19

(Continued)

FOREIGN PATENT DOCUMENTS

DE 10 2004 020 384 A1 8/2005
EP 0 658 321 A1 6/1995
(Continued)

OTHER PUBLICATIONS

International Search Report and Written Opinion for PCT/US2015/000266, dated Aug. 30, 2016, 13 pages.

*Primary Examiner* — Elliot S Ruddie
(74) *Attorney, Agent, or Firm* — Dority & Manning, P.A.

(57) ABSTRACT

A disposable facemask is provided having a filter body with an opening sized to cover the nose and mouth of a wearer. The filter body further includes an outer mask layer and an inner mask layer, and one or more intermediate layers disposed between the outer and inner mask layers. At least one of the intermediate layers is a nonwoven web layer including thermoplastic filaments formed from a random copolymer, or a random copolymer blended with a homopolymer.

12 Claims, 4 Drawing Sheets

(51) Int. Cl.
- *B01D 39/16* (2006.01)
- *B32B 5/02* (2006.01)
- *B32B 5/26* (2006.01)
- *D04H 3/005* (2012.01)

(52) U.S. Cl.
CPC .......... *B01D 39/1623* (2013.01); *B32B 5/022* (2013.01); *B32B 5/26* (2013.01); *A41D 2400/52* (2013.01); *A41D 2500/30* (2013.01); *A41D 2500/52* (2013.01); *B01D 2239/0618* (2013.01); *B01D 2239/0622* (2013.01); *B01D 2239/0627* (2013.01); *B01D 2239/065* (2013.01); *B32B 2250/20* (2013.01); *B32B 2250/24* (2013.01); *B32B 2250/40* (2013.01); *B32B 2262/0253* (2013.01); *D04H 3/005* (2013.01); *D10B 2401/041* (2013.01)

(58) Field of Classification Search
CPC ............ A41D 2500/30; A41D 2500/52; B01D 39/1623; B01D 2239/0618; B01D 2239/0622; B01D 2239/0627; B01D 2239/065; B32B 5/022; B32B 5/26; B32B 2250/20; B32B 2250/24; B32B 2250/40; B32B 2262/0253; D04H 3/005; D10B 2401/041

See application file for complete search history.

(56) References Cited

U.S. PATENT DOCUMENTS

| | | | |
|---|---|---|---|
| 4,966,140 A | 10/1990 | Herzberg | |
| 5,042,532 A | 8/1991 | Gilleland | |
| 5,307,796 A | 5/1994 | Kronzer et al. | |
| 5,322,061 A * | 6/1994 | Brunson | A41D 13/1184 128/206.13 |
| 5,620,785 A * | 4/1997 | Watt | A41D 13/11 128/206.12 |
| 6,055,982 A | 5/2000 | Brunson et al. | |
| 6,354,296 B1 | 3/2002 | Baumann et al. | |
| 7,381,666 B2 * | 6/2008 | Little | A41D 13/1209 442/394 |
| 7,897,659 B2 | 3/2011 | Leung | |
| 8,334,327 B2 | 12/2012 | Kaufman et al. | |
| 9,320,923 B2 | 4/2016 | Koehler | |
| 2001/0005504 A1 | 6/2001 | Matsuda et al. | |
| 2001/0014395 A1 * | 8/2001 | Mleziva | D01D 5/22 428/369 |
| 2004/0121690 A1 | 6/2004 | Mleziva et al. | |
| 2007/0039620 A1 | 2/2007 | Sustello | |
| 2007/0068529 A1 | 3/2007 | Kalatoor et al. | |
| 2008/0023006 A1 | 1/2008 | Kalatoor | |
| 2009/0211582 A1 * | 8/2009 | Reese | A41D 13/1107 128/206.21 |
| 2011/0097539 A1 | 4/2011 | Oberndorfer et al. | |
| 2015/0233031 A1 | 8/2015 | Kunimoto et al. | |
| 2016/0001101 A1 | 1/2016 | Sabolis et al. | |

FOREIGN PATENT DOCUMENTS

| | | |
|---|---|---|
| EP | 1 671 554 A1 | 6/2006 |
| EP | 1 990 071 A1 | 11/2008 |
| EP | 2 022 879 A1 | 2/2009 |
| GB | 2507296 A | 4/2014 |
| JP | 2003-180852 A | 7/2003 |
| JP | 2005152030 A | 6/2005 |
| JP | 2011125494 A | 6/2011 |
| WO | WO 93/24152 A1 | 12/1993 |
| WO | WO 99/55179 A1 | 11/1999 |
| WO | WO 2007/038202 A1 | 4/2007 |
| WO | WO 2014/150481 A1 | 9/2014 |
| WO | WO2015080228 A1 | 6/2015 |

\* cited by examiner

FACEMASKS WITH MATERIAL LAYERS FOR ENHANCED BONDING PROCESS

CROSS-REFERENCED TO RELATED APPLICATIONS

This application is a national phase of and claims priority to PCT/US2015/000266, filed Dec. 23, 2015, the contents of which are incorporated herein by reference hereto.

FIELD OF THE INVENTION

The present invention relates generally to the field of protective facemasks, and more specifically to a facemask with one or more layers that provide short dwell time thermal bonding of the facemask layers.

BACKGROUND OF THE INVENTION

Various configurations of disposable filtering facemasks or respirators are known and may be referred to by various names, including "facemasks", "respirators", "filtering face respirators", and so forth. For purposes of this disclosure, such devices are referred to generically as "facemasks."

The ability to supply aid workers, rescue personnel, and the general populace with protective facemasks during times of natural disasters or other catastrophic events is crucial. For example, in the event of a pandemic, the use of facemasks that offer filtered breathing is a key aspect of the response and recovery to such event. For this reason, governments and other municipalities generally maintain a ready stockpile of the facemasks for immediate emergency use. However, the facemasks have a defined shelf life, and the stockpile must be continuously monitored for expiration and replenishing. This is an extremely expensive undertaking.

Recently, investigation has been initiated into whether or not it would be feasible to mass produce facemasks on an "as needed" basis during pandemics or other disasters instead of relying on stockpiles. For example, in 2013, the Biomedical Advanced Research and Development Authority (BARDA) within the Office of the Assistant Secretary for Preparedness and Response in the U.S. Department of Health and Human Services estimated that up to 100 million facemasks would be needed during a pandemic situation in the U.S., and proposed research into whether this demand could be met by mass production of from 1.5 to 2 million facemasks per day to avoid stockpiling. This translates to about 1,500 masks/minute. Current facemask production lines are capable of producing only about 100 masks/minute due to technology and equipment restraints, which falls far short of the estimated goal. Accordingly, advancements in the manufacturing and production processes will be needed if the goal of "on demand" facemasks during a pandemic is to become a reality.

One factor affects the ability to produce facemasks at the desired rate is the thermal bonding together of the various layers of facemasks at an increased rate (e.g., reduced dwell time) without comprising the critical functions of the facemasks, such as filtration efficiency, integrity, breathability, and so forth.

The present invention addresses this need and provides a material layer combination that allows for increased production rates at shorter thermal bonding dwell times as compared to conventional material layers.

SUMMARY OF THE INVENTION

Objects and advantages of the invention will be set forth in the following description, or may be obvious from the description, or may be learned through practice of the invention.

Applicant believes that, with conventional facemasks and associated production lines, due to the relatively high melt index of the polymer materials used to form the various conventional intermediate layers of the filter body, dwell time of the materials at the bonding stations is a limiting factor in the goal of achieving the overall facemask production rates necessary for on-demand manufacturing during a pandemic situation. It is anticipated that the conventional production rates must increase to about 10 to 15 fold, and that to achieve these rates, the ultrasonic bond time must be shortened significantly without sacrificing the integrity and function of the bonds. Applicant further believes that the limiting materials for the edge bonds defining the filtration body are not the conventional outer spun-bond layers, but the materials making up the intermediate layers of the filter body. These intermediate layers require additional dwell time for achieving a secure bond between all of the layers, particularly as the number of intermediate layers increase. This is particularly true at the critical corner bond where the number of layers is increased by the folded over edge binder materials. These issues are addressed by a material combination for the intermediate material layers in accordance with aspects of the invention.

Accordingly, a disposable facemask in accordance with the invention includes a filter body having an opening sized to cover the nose and mouth of a wearer. The filter body further includes an outer mask layer and an inner mask layer, and one or more intermediate layers disposed between the outer and inner mask layers. From at least one to all of the intermediate layers is formed from a nonwoven web layer including thermoplastic filaments formed from a random copolymer, or a random copolymer blended with a homopolymer. For example, the filter body in one embodiment includes a plurality of intermediate layers, with at least two of the intermediate layers formed from the nonwoven web layer including thermoplastic filaments formed from a random copolymer, or a random copolymer blended with a homopolymer.

In a particular embodiment, the filter body includes an upper portion and a lower portion, wherein the upper and lower portions are bonded along three sides to define a duckbill-style facemask having an opening defining by top and bottom edge along a fourth side of the upper and lower portions.

The random copolymer in one embodiment is an ethylene-propylene random copolymer, with from about 0.5 percent to about 10 percent, by weight, ethylene, and from about 99.5 to about 90 percent, by weight, propylene.

In another embodiment, the random copolymer is a butylene-propylene random copolymer, with from about 0.5 percent to about 20 percent, by weight, butylene, and from about 99.5 to about 80 percent, by weight, propylene.

Desirably, the random copolymer has a peak melting point between about 137 and about 153 degrees Celsius.

The nonwoven web intermediate layer is a nonwoven selected from the group consisting of a web of spunbonded fibers, a web of meltblown fibers, a bonded carded web of fibers, a multi-layer material including at least one of the webs of spunbonded fibers, meltblown fibers, and a bonded carded web of fibers.

In still another embodiment, the thermoplastic filaments comprise a blend the random copolymer and a homopolymer, with between about 10% and about 90% by weight random copolymer.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

For purposes of this description, "nonwoven" or "nonwoven web" refers to materials and webs of material having a structure of individual fibers or filaments which are interlaid, but not in an identifiable manner as in a knitted fabric. Nonwoven fabrics or webs have been formed from many processes such as, for example, meltblowing processes, spunbonding processes, air laying processes, coforming processes, and bonded carded web processes. The basis weight of nonwoven fabrics is usually expressed in ounces of material per square yard (osy) or grams per square meter (gsm) and the fiber diameters are usually expressed in microns. (Note that to convert from osy to gsm, multiply osy by 33.91.)

"Peak melting point" refers to the apparent peak temperature at which maximum melting occurs. Peak melting point can be determined with differential scanning calorimetry (DSC). More particularly, peak melting points can be easily assessed and confirmed in DSC thermograms.

"Polymers" include, but are not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic, syndiotactic and random symmetries.

"Bonded" and "bonding" refer to the joining, adhering, connecting, attaching, or the like, of two elements. Two elements will be considered to be bonded together when they are bonded directly to one another or indirectly to one another, such as when each is directly bonded to intermediate elements.

Various styles and configurations of facemasks, including generally trapezoidal cone masks and flat pleated facemasks are well-known, and the present methods may have utility in the production lines for these conventional masks. For illustrative purposes only, aspects of the present method are described herein with reference to a particular type of trapezoidal respirator facemask often referred to in the art as a "duckbill" mask, as illustrated in FIG. 1.

Figure 1:
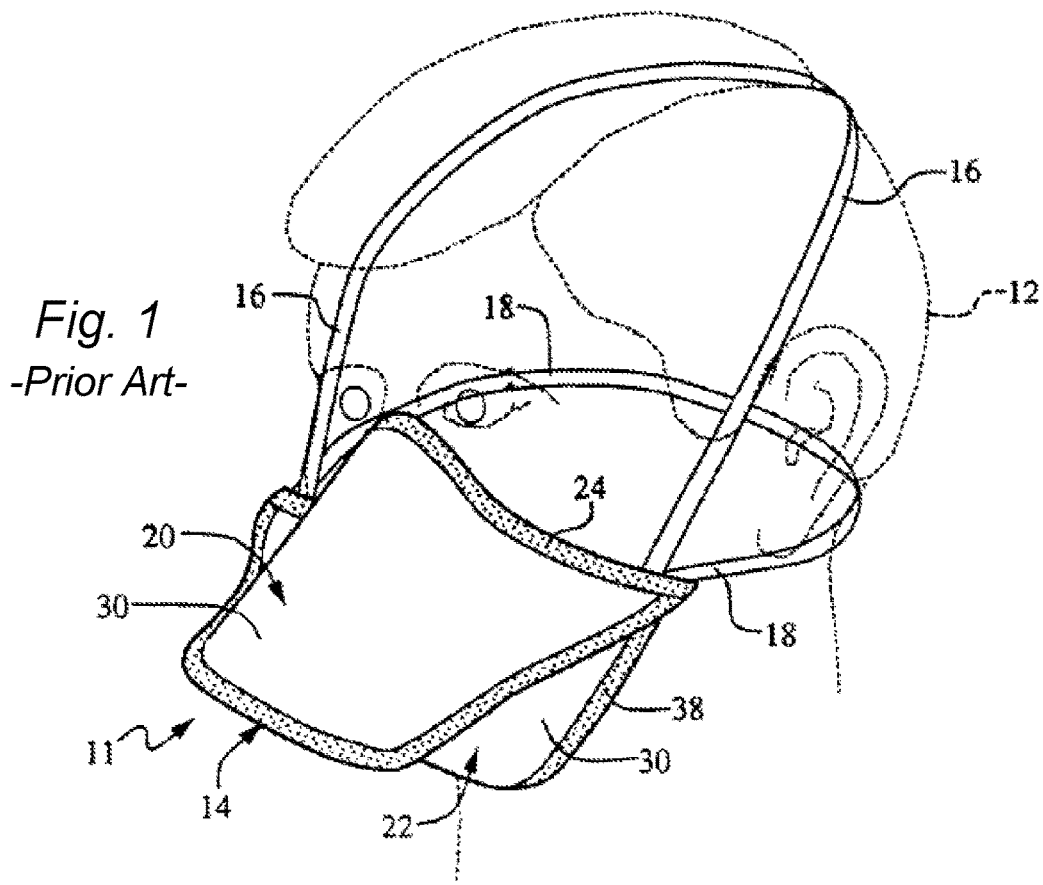
FIG. 1 is a perspective view of a conventional respiratory facemask worn by a user.
Figure 2:
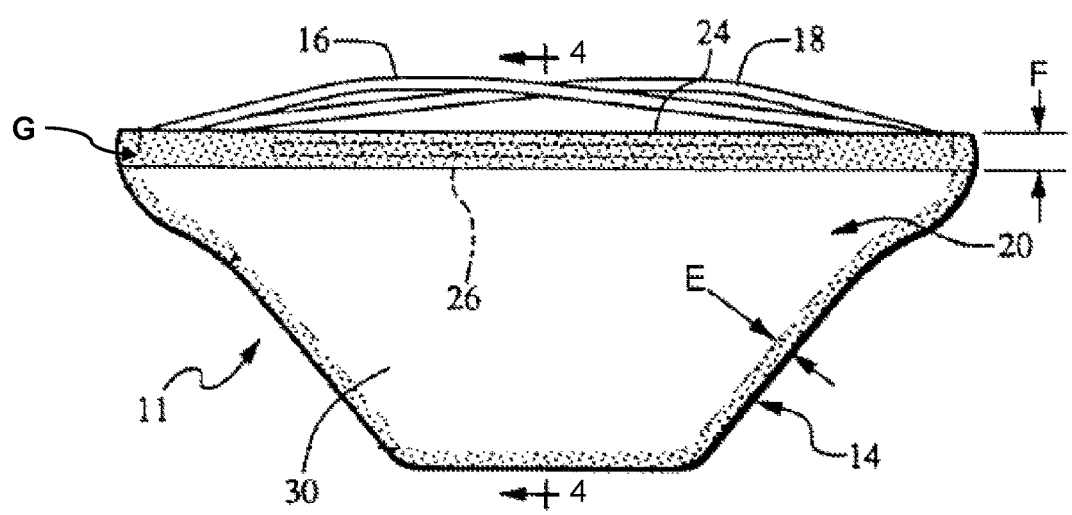
FIG. 2 is a top view of the conventional facemask of FIG. 1 in a folded state.

Referring to FIGS. 1 and 2, a conventional duckbill facemask 11 is illustrated as being positioned on the face of wearer 12 shown in ghost lines. The mask 11 includes filter body 14 that is secured to wearer 12 by means of resilient and elastic straps or securing members 16 and 18. The filter body 14 includes an upper portion 20 and a lower portion 22, which have a generally identical trapezoidal configuration, and are bonded together, such as by thermal and/or ultrasonic bonding, along three sides. Such bonding adds important structural integrity to the facemask 11.

The facemask 11 has an open side and includes a top edge 24 configured for receipt of an elongated malleable member 26, such as an aluminum strip or wire, so that the top edge 24 can be manipulated to closely fit the contours of the nose and cheeks of wearer 12. The malleable member 26 may also be a moldable or malleable steel or plastic member. With the exception of having the malleable member 26 located along the top edge 24 of upper portion 20, the upper and lower portions 20 and 22 may be identical and have the same material layers. The top edge 24 of upper portion 20 and the bottom edge 38 of the lower portion 22 cooperate with each other to define the periphery of mask 11 that contacts the face of wearer 12.

As shown in FIG. 1, the facemask 11 has the general shape of a cup or cone when placed on the face of wearer 12, thus providing the mask 11 with "off-the-face" benefits of a molded-cone style mask while still being easy for wearer 12 to carry the facemask 11 in a pocket prior to use. As is generally appreciated, "of-the-face" style masks provide a larger breathing chamber as compared to soft, pleated masks which contact a substantial portion of the wearer's face. Therefore, "off-the-face" masks permit cooler and easier breathing, and excessive heating of the air within filter body 14 and dizziness from prolonged periods of rebreathing exhaled air is minimized.

Still referring to FIG. 1, "E" represents the bonded border defining the three closed sides of the facemask 11. The top edge 24 and bottom edge 38, which contact the wearer's face, have a bonded dimension "F". In a production line, these bonds E and F are made by conventional thermal and/or ultrasonic bonding systems wherein the material layers are subjected to the bonding procedure for a required "dwell time" to ensure a proper and secure bond. Such bonding procedures are well known to those skilled in the art and a detailed description thereof is not necessary for an understanding and appreciation of a facemask 11 in accordance with the invention, as discussed in greater detail below.

Figure 4:
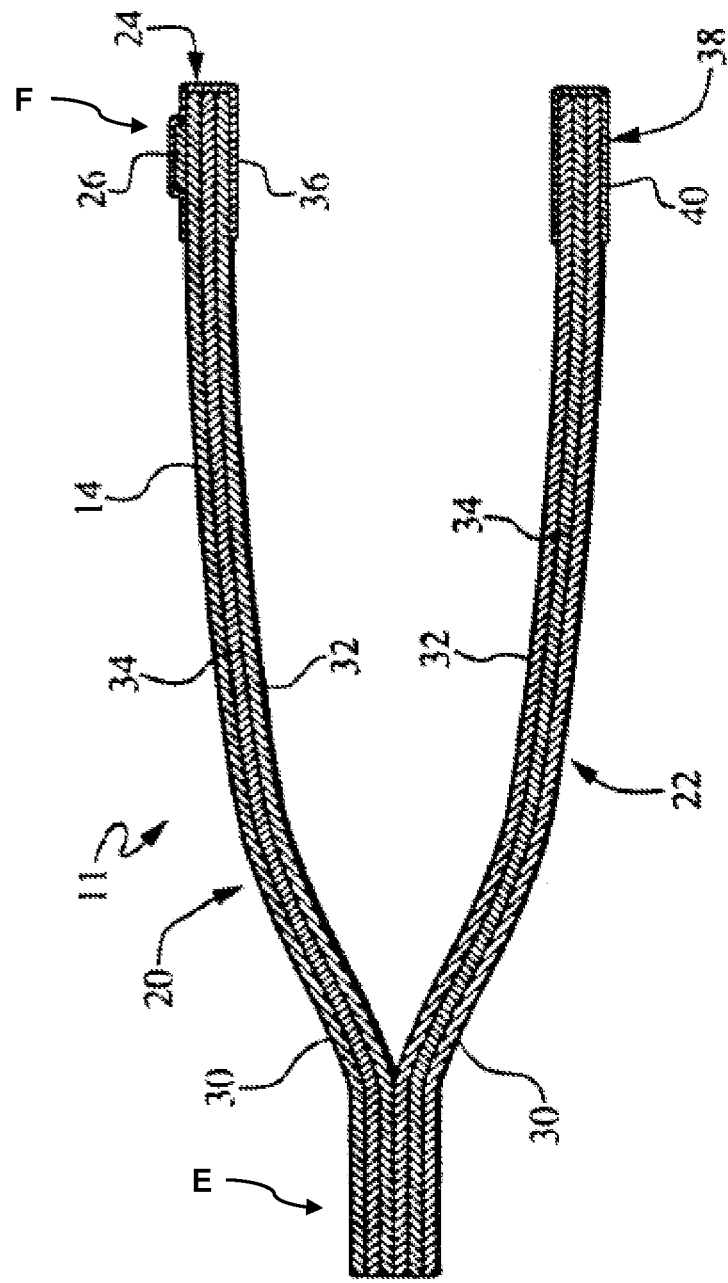
FIG. 4 is a cross-sectional view of a facemask in accordance with the invention taken along the lines indicated in FIG. 1.
Figure 5:
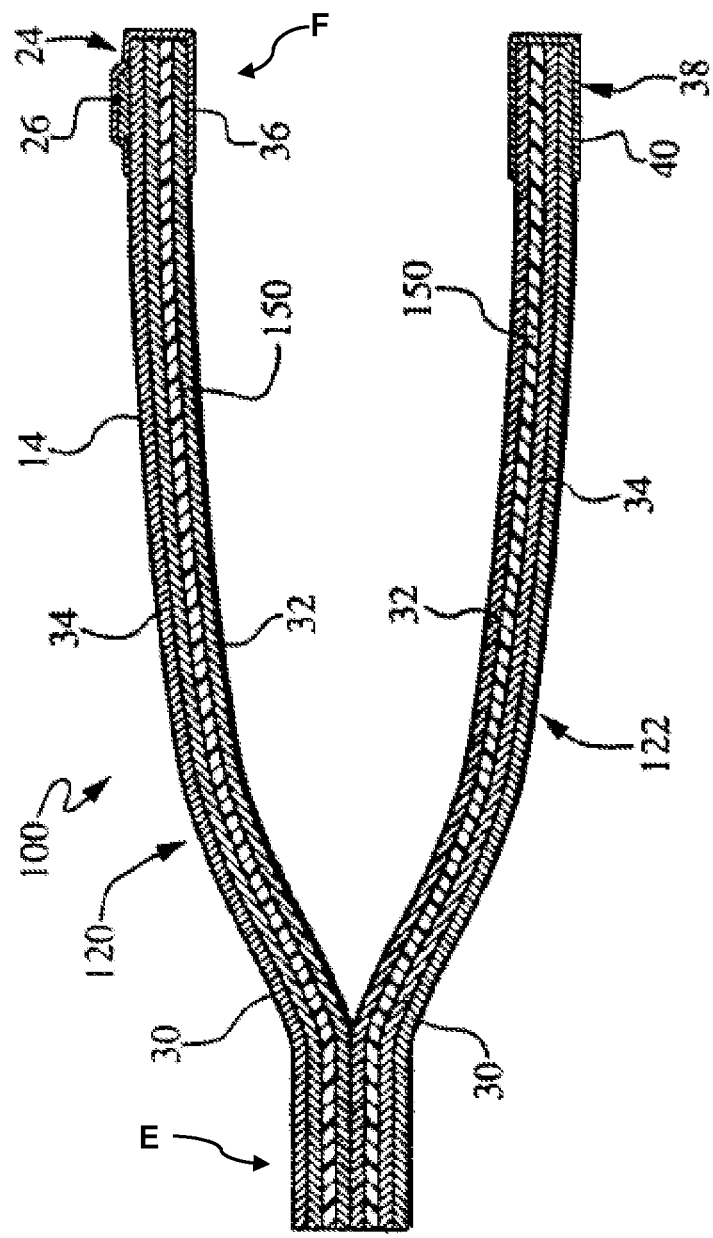
FIG. 5 is a cross-sectional view of an alternative embodiment of a facemask in accordance with the invention.

As illustrated in FIGS. 4 and 5, the upper and lower portions 20 and 22 each include an outer mask layer 30 that is preferably constructed from a spun-bonded polypropylene. The outer mask layers 30 may also be constructed from a bi-component and/or powder bonded material such as polyethylene or polypropylene, a cellulastic tissue, or a spun-bonded polyester. Suitable outer mask layers 30 typically have a basis weight range of 0.5 ounces per yard to 1.0 ounces per yard. Each of the upper and lower portions 20, 22 also include an inner mask layer 32, which may be composed of a bicomponent polyethylene and polypropylene. Layers 32 may also be constructed from polyester polyethylene material or cellulastic tissue. The layers 32 typically have a basis weight range of 0.4 ounce per yard to 0.75 ounces per yard. Located between the outer mask layer 30 and inner mask layer 32 are one or more intermediate mask layers 34 that comprises the filter media for mask 11. It should be appreciated that although FIG. 4 illustrates only one intermediate layer 34, embodiments of facemasks 11 according to the invention may include multiple intermediate mask layers 34 of the same or different type of material. The intermediate mask layers 34 will be described in greater detail below, but are preferably constructed from a melt-blown polypropylene, or from an extruded polycarbonate, a melt-blown polyester, or a melt-blown urethane.

FIG. 5 depicts a facemask embodiment 100 that incorporates inner mask layers 32 and intermediate mask layers 34 comprising part of the filter media for mask 100. For example, the layers 32 and 34 may be separate melt-blown filtration layers. In addition, the mask 100 includes a fourth intermediate layer 150 in both the upper portion 120 and lower portion 122. The layers 150 may be comprised of a material similar to that for layers 34. Desirably, the barrier layer 150 is constructed from a barrier material that is gas permeable and permits gas to pass through the mask in both directions, and is impermeable to liquid passing through mask 100 in at least one direction. Suitable barrier materials are known and in used in the art, and are generally constructed from a low density polyethylene and include small apertures which prevent liquids from passing therethrough due to the liquid's relatively high surface tension. Other types of microporous film may be satisfactorily used as a barrier layer 150 with the present invention.

The use of layers 150 is particularly important when mask 100 is worn in an environment where the wearer may be exposed to "body fluids". These fluids such as blood, urine and saliva may contain highly contagious germs. Contact of AIDS-contaminated body fluids with another person's source of body fluids, such as the eye, nose and mouth, may transmit the disease. Therefore, it is necessary to include layers 150 which are resistant to the passage of body fluids in one direction to prevent such body fluids from contacting the nose and mouth of the wearer. Layers 150 prevent the passage of liquids from the exterior of mask 100 from contacting the face of a wearer covered by mask 100.

Facemasks are known in the industry that numerous variations of material layers between the outer mask layer 30 and inner mask layer 32 of each mask portion 20, 22. For example, Halyard Health of Alpharetta, Ga., USA, offers a duckbill style protective facemask identified as "Respirator Code # 467727" wherein each portion 20, 22 has five layers (including the outer and inner mask layers). All such inner material layer variations are within the scope and spirit of the invention.

The top edge 24 of mask 11 is faced with an edge binder 36 that extends across the open end of mask 11 and covers the malleable strip 26. Similarly, lower portion 22 of mask 11 forms a bottom edge 38 that is encompassed in an edge binder 40. The edge binders 36 and 40 are preferably constructed from a spun-laced polyester material. The binders may also be constructed from a number of thermally bonded bicomponent materials or from polypropylene or polyethylene non-porous plastic films.

Referring to FIGS. 4 and 5 in particular, it can be readily appreciated that the ultrasonic bond E around the three closed sides of the facemask entails bonding together all of the multiple layers in both portions 20, 22. Thus, if each of the upper and lower portions 20, 22 include only a single intermediate filtration layer 134, the bond E still includes six total layers (each portion 20, 22 includes three layers). In the embodiment of FIG. 5, each of the upper and lower portions 20, 22 includes a total of five layers, wherein the bond E thus includes ten total layers.

The bond E is even more critical at the corner bond G depicted in FIG. 2 where the border bond E meets the two top edge bonds F. Each top edge bond F includes two additional layers resulting from the folded-over edge binders 36, 40, as can be readily appreciated from the views of FIGS. 4 and 5. Thus, for the embodiment of FIG. 4, each corner bond G has ten layers (four additional layers from the folded-over edge binders 36, 40). Similarly, for the embodiment of FIG. 5, the each corner bond G has 14 layers.

Due to the relatively high melt index of the polymer materials used to form the various conventional intermediate layers 34, 32, 150 of the panel portions 20, 22, dwell time of the materials at the bonding stations is believed to be a limiting factor in the goal of achieving the overall facemask production rates necessary for on-demand manufacturing during a pandemic situation. On certain conventional facemask processing lines, the facemask production rate is about 100 masks/minute. It is anticipated that this production rate must increase to about 10 to 15 fold of the current rate, e.g., about 1,500 masks/min. To achieve these rates, the thermal/ultrasonic bond time must be shortened significantly without sacrificing the integrity and function of the bonds.

Applicant has determined that the limiting considerations for the bonds E, F, G are not the conventional spun-bond layers 30, 32, but the materials making up the intermediate layers 34, 32. These intermediate layers require additional dwell time for achieving a secure bond between all of the layers, particularly as the number of intermediate layers increase. This is particularly true at the critical corner bond G where the number of layers is increased by the folded over edge binder materials 36, 40.

In accordance with the invention, one or more of the intermediate layers (collectively identified as "34") between the inner and outer mask layers 30, 32 in each portion include a nonwoven web made up of thermoplastic filaments formed from a resin that delivers a relatively low peak melting point and a relatively broad melting curve to create strong individual point bonds and exceptional thermal/ultrasonic bonding. More particularly, the thermoplastic filaments may be formed from a random copolymer, or a random copolymer blended with a homopolymer. The copolymer has a peak melting point between about 137 and 153, or between about 142 and about 153, or between about 145 and about 150 degrees Celsius.

The new intermediate layers 34 according to the invention are designed, through choice of polymer, basis weight, and bond pattern or bond area, to provide a desired softness and filtration capability for use in a facemask, as well as the ability to be ultrasonically boned at speeds significantly greater than in conventional facemask production lines.

U.S. Patent Application Publication No. 2004/0121690 describes an elastomeric laminate material having a facing layer laminated to an elastomeric layer. Applicant believes that the facing layer alone described in the '690 publication has the material characteristics suitable for use as an intermediate layer in a facemask in accordance. In this regard, the '690 publication is incorporated herein in its entirety for all purposes. Aspects of this facing layer (for use as a facemask intermediate layer 34) are also described below.

The copolymer from which the intermediate layer 34 is made may be an ethylene-propylene random copolymer containing from about 0.5 percent to about 10 percent, by weight, ethylene, and from about 99.5 to about 90 percent, by weight, propylene. Alternatively, the olefin copolymer may include polypropylene modified by copolymerizing 0.5-5.0% ethylene randomly in the backbone. As another alternative, the copolymer may be a butylene-propylene random copolymer containing from about 0.5 percent to about 20 percent, by weight, butylene, and from about 99.5 to about 80 percent, by weight, propylene. The random copolymer provides exceptional softness as well as improved bonding capabilities. Typically, softer materials have weaker tear strengths and tensile strengths, but it has been discovered that by incorporating random copolymer into the intermediate layer 34 materials, the resulting intermediate layer 34 acquire greater softness without sacrificing bond strength. One example of a commercially available random copolymer suitable for making the facing layer is Dow 6D43 random copolymer which includes about 3% ethylene in polypropylene, available from Dow Chemical Company of Midland, Mich. Other suitable random copolymers include SRD 6581 and 6D82, both available from Dow Chemical Company.

In another embodiment, the intermediate layer 34 may include a blend of a random copolymer and a homopolymer. In this embodiment, the random copolymer may account for between about 10% and about 90%, or between about 20% and about 80%, or between about 24% and about 40% by weight of the facing layer. For example, Dow 6D43 may be blended with standard polypropylene, such as Exxon-Mobil 3445, available from Exxon-Mobil Chemical Company of Baytown, Tex. Other suitable polypropylene homopolymers include Dow 6811, Dow 5D49, Exxon-Mobil 3155, Exxon-Mobil 3854, Basell 308, Basell 304, and BP 7954.

As a filtration layer or a barrier layer, the intermediate layer 34 is suitably a nonwoven web of fibers, such as, for example, a web of spunbonded fibers, a web of meltblown fibers, a bonded carded web of fibers, a multilayer material including at least one of the webs of spunbonded fibers, meltblown fibers, or a bonded carded web of fibers, such as a spunbond-meltblown-spunbond web, or the like. Other nonwoven materials, such as coform and/or airlaid materials, may also be suitable for use as facing layers. The intermediate layer 34 suitably has a basis weight of less than about 20 grams per square meter (gsm), or between about 7 and about 20 gsm, or between about 12 and about 20 gsm.

The intermediate layer 34 is thermally point bonded, which involves passing a fabric or web of fibers to be bonded between a heated calender roll and an anvil roll. The calender roll is usually, though not always, patterned in some way so that the entire fabric is not bonded across its entire surface. As a result, various patterns for calender rolls have been developed for functional as well as aesthetic reasons. One example of a pattern has points and is the Hansen Pennings or "H&P" pattern with about a 30% bond area with about 200 bonds/square inch as taught in U.S. Pat. No. 3,855,046 to Hansen and Pennings. The H&P pattern has a square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen and Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm). The resulting pattern has a bonded area of about 15%. Yet another common pattern is the C-Star pattern which has a bond area of about 16.9%. The C-Star pattern has a cross-directional bar or "corduroy" design interrupted by shooting stars. Other common patterns include a diamond pattern with repeating and slightly offset diamonds and a wire weave pattern looking as the name suggests, e.g., like a window screen. The wire weave bond pattern has a bond area between about 14.5% and about 25%. As is well known in the art, the spot bonding holds the laminate layers together as well as imparts integrity to each individual layer by bonding filaments and/or fibers within each layer.

Suitably, the intermediate layer 34 has a bond area of between about 15% and about 34%, or between about 26% and about 31%. Lower cost and higher tension may be achieved through the application of a bond pattern, however softness (and thus filtration efficiency) may be compromised if the bond pattern takes up too much area. For example, the H&P bond pattern delivers lower cost/higher tension than the wire weave bond pattern but is not as soft as the wire weave due to the higher bond area of the H&P.

Because of the polymeric composition of the nonwoven intermediate layer 34, the material is particularly conducive to ultrasonic bonding. It is believed that the layer 34 can be ultrasonically bonded to another substrate, which may be either the same or a different material (e.g., spun-bond outer layers 30, 32 and one or more additional intermediate layers 34) in a facemask production line at speeds significantly greater than current production speeds.

In one method of producing the intermediate layer 34 described above, thermoplastic filaments formed from a random copolymer or a random copolymer blend, for example, are randomly deposited onto a forming belt to form the nonwoven intermediate layer 34, in a manner conventionally used to form nonwoven webs as known to those skilled in the art. As the filaments are deposited on the forming belt, a vacuum unit may be positioned under the forming belt to pull the filaments towards the forming belt during the formation of the web. As the layer 34 is formed, the web is passed through a calender, including a calender roller and an anvil roller, to bond the filaments for further formation of the web. While the anvil roller is suitably smooth, the calender roller may be smooth or patterned to add a bond pattern to the intermediate layer 34, as described above. One or both of the calender roller and the anvil roller may be heated and the pressure between these two rollers may be adjusted by well-known means to provide the desired temperature, if any, and bonding pressure to form the nonwoven intermediate layer 34.

Figure 3:
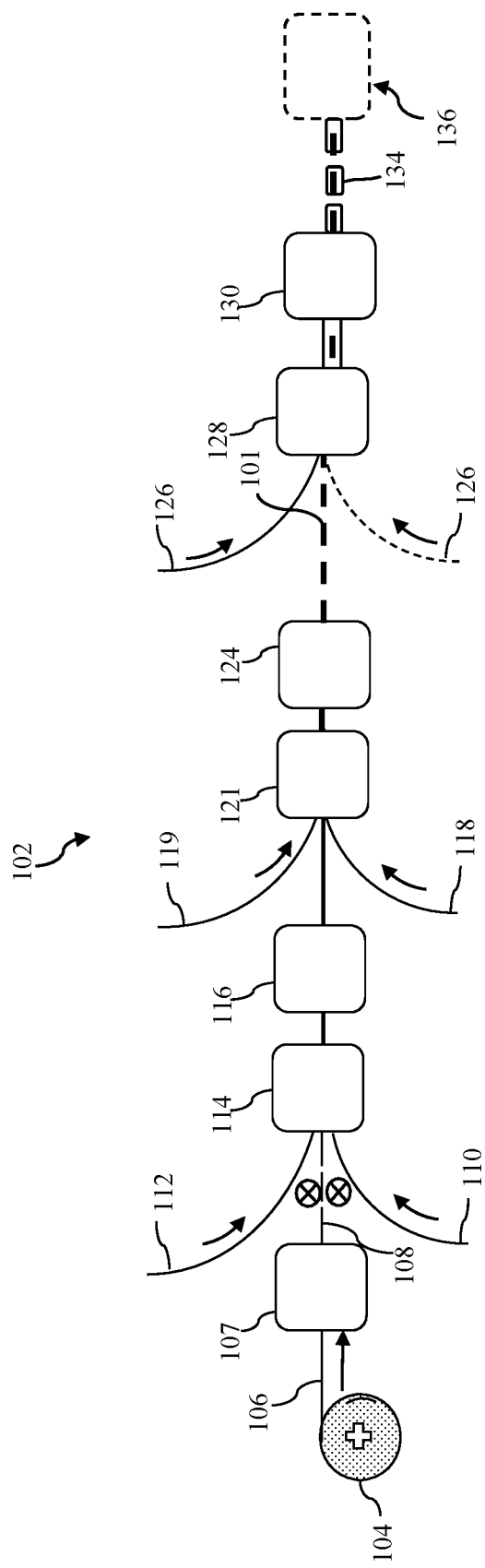
FIG. 3 is a schematic representation of facemask production line in which embodiments of the present facemasks may be manufactured.

FIG. 3 represents an exemplary production line 102 for manufacture of facemasks incorporating one or more intermediate layers in accordance with the invention. A running nose wire 106 is supplied in continuous strip form from a source, such as a driven spool or roll 104, to a cutting station 107 wherein the wire 106 is cut into individual nose wires 108 having a defined length. Suitable cutting stations 108 are known and used in conventional production lines. The nose wires 108 are conveyed onto a carrier web 110, which may be the combination of layers defining the upper body portion 20 of the finished facemask, wherein the upper portion 20 includes one or more intermediate layers 34 formed as described above. The individual nose wires 108 are deposited along the edge of the carrier web 110 corresponding to the top edge 24 of the facemask 11 in FIG. 4.

After placement of the individual nose wires 108 in position on the carrier web 110, a binder web 112 is introduced to the production line 102 along the edge of the carrier web 110. The combination of carrier web 110, nose wire 108, and binder webs 112 pass through a folding station 114 wherein the binder web 112 is folded around the respective running edge of the carrier web 110. The components then pass through a bonding station 116 wherein the binder webs 112 are thermally bonded to the carrier web 110, thereby producing the edge configurations 24, 38 depicted in FIGS. 4 and 5. The nose wire 108 is essentially encapsulated along the top edge 24 by the binder web 112.

From the bonding station 116, the continuous combination of carrier web 110 with nose wires 108 encapsulated in the binder 112 is conveyed to another bonding station 121. At this station, an additional web 118 is introduced that corresponds to the lower panel portion 22 of the face mask 11 depicted in FIGS. 4 and 5. As with the upper portion 20, this web 118 may include one or more intermediate layers 34 formed as described above. This web 118 may already have the binder web applied to the edge thereof from an upstream process. Continuous elastomeric straps 119 are also introduced and are laid between the edges of the web 118 and web 110 corresponding to the edges 24, 28 in FIG. 1. The materials are bonded together in a bond pattern that corresponds to the trapezoidal shape of the facemask 11 with a closed end and an open end at the edges 24, 28.

The bonded webs 110 and 118 (with nose wires and straps) are conveyed to a cutting station 124 wherein the individual facemasks 101 are cut out from the webs along the bond lines. The facemasks 101 are then conveyed to a bonding station 128 wherein wrapping materials 126 (e.g. a poly material) are introduced and are folded (if necessary) and bonded around the individual facemasks 101. A single web of the wrapping material 126 may be folded around the facemasks and sealed along a continuous longitudinal bond line or, in an alternate embodiment depicted by the dashed line in FIG. 3, an additional web of the wrapping material 126 may be introduced to the bonding station, wherein the facemasks are sandwiched between the two webs 126. The webs 126 are then sealed along continuous longitudinal bond lines along their mating edges.

A continuous stream of wrapped facemasks 132 emerge from the bonding station 128 and are conveyed to a cutting station 130 wherein cuts are made in the bonded wrapping material in a desired pattern to produce individual wrapped facemasks 134. These masks 134 are conveyed to downstream processing stations 136 for further processing, including stacking and packaging.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A disposable facemask, comprising:
   a filter body having an opening sized to cover a nose and a mouth of a wearer, the filter body comprising an upper portion and a lower portion,
   each of the upper and the lower portions comprising an outer mask layer, an inner mask layer, and one or more intermediate layers disposed between the outer mask layer and the inner mask layer, the outer mask layer, the inner mask layer, and the one or more intermediate layers of each of the upper and the lower portions being bonded together via thermal or ultrasonic bonding at bond locations along three sides of the facemask to define a duckbill-style facemask, wherein the bond locations comprise additional layers than remaining portions of the filter body, wherein the additional layers comprise folded-over edge binders constructed from a spun-laced polyester, thermally-bonded bicomponent materials, or polypropylene or polyethylene non-porous plastic films,
   wherein the one or more intermediate layers are constructed of a nonwoven web layer comprising thermoplastic filaments formed from a random copolymer or the random copolymer blended with a homopolymer, the random copolymer having a low peak melting point within a temperature range between 137 and 153 degrees Celsius so as to decrease a dwell time of the bond locations containing the additional layers as compared to a dwell time of a facemask constructed of material layers having random copolymers with a peak melting point outside of the temperature range.

2. The facemask according to claim 1, wherein the one or more intermediate layers comprise a plurality of intermediate layers, wherein at least two of the plurality of intermediate layers comprise the nonwoven web layer including thermoplastic filaments formed from the random copolymer, or the random copolymer blended with the homopolymer.

3. The facemask according to claim 2, wherein each of the plurality of intermediate layers comprise the nonwoven web layer including thermoplastic filaments formed from the random copolymer, or the random copolymer blended with the homopolymer.

4. The facemask according to claim 1, wherein the random copolymer comprises an ethylene-propylene random copolymer, with from about 0.5 percent to about 10 percent, by weight, ethylene, and from about 99.5 to about 90 percent, by weight, propylene.

5. The facemask according to claim 1, wherein the random copolymer comprises a butylene-propylene random copolymer, with from about 0.5 percent to about 20 percent, by weight, butylene, and from about 99.5 to about 80 percent, by weight, propylene.

6. The facemask according to claim 1, wherein the nonwoven web intermediate layer comprises a nonwoven selected from the group consisting of a web of spunbonded fibers, a web of meltblown fibers, a bonded carded web of fibers, a multi-layer material including at least one of the webs of spunbonded fibers, meltblown fibers, and a bonded carded web of fibers.

7. The facemask according to claim 1, wherein the thermoplastic filaments comprise a blend of the random copolymer and the homopolymer.

8. The facemask according to claim 7, wherein the thermoplastic filaments comprise between about 10% and about 90% by weight random copolymer.

9. The facemask according to claim 8, wherein the thermoplastic filaments comprise between about 20% and about 80% by weight random copolymer.

10. The facemask according to claim 8, wherein the thermoplastic filaments comprise between about 24% and about 40% by weight random copolymer.

11. The facemask according to claim 1, wherein the nonwoven web intermediate layer has a bond area of between about 15% and about 34%.

12. The facemask according to claim 1, wherein the nonwoven web intermediate layer has a basis weight of less than about 20 grams per square meter.

* * * * *